Patented June 1, 1926.

1,586,731

UNITED STATES PATENT OFFICE.

PAUL ANFT, OF BREMEN, GERMANY.

METHOD FOR THE MANUFACTURING OF BUTTONS.

No Drawing. Application filed February 21, 1924, Serial No. 694,431, and in Germany November 6, 1922.

This invention relates to a method for the manufacturing of buttons which are distinguished from the commonly used buttons not only by their outer appearance but also as regards durability. The buttons made according to the new method are further cheap to manufacture and adapted to be shaped in an especially suitable manner.

The new manufacturing method consists in mixing together at the dry state Portland cement, calcite and colouring substance, in moistening the mixture with a solution of sodium chloride or soap and in pressing the moist mass into moulds. Prior to the moistening a powder is preferably added which has been prepared from a hardened mass of Portland cement, infusorial earth (infusorial silica) and milk of lime.

One part by volume of Portland cement and one part by volume of infusorial earth are preferably intimately mixed, stirred with milk of lime up to syrup-like consistency and spread out for drying. After this mass has thoroughly bound it is crushed in mills until a fine powder-like flour is obtained. One part by volume of this mass is well mixed at dry state with one part of Portland cement, one part by volume of calcite (finely ground shell lime) and the required colouring substance.

This mixture is moistened with the aid of water in which per liter 20 grams of sodium chloride are dissolved, filled in moulds and pressed. The moulded body can be removed from the mold directly after the pressing and after having well hardened it can be polished in polishing drums or polishing disks.

The method may be varied in the following manner: Two parts by volume of Portland cement, one part by volume of calcite and the determined colouring substance are well mixed together at dry state. This dry mass is stirred with a soap solution at 7%, pressed and subsequently treated as stated above. After the hardening, but prior to the polishing, the moulded bodies have to be saturated with an alum solution of 5%.

Although the holes for the buttons may be drilled by means of drilling machines they might be stamped out at the pressing.

Instead of calcite finely ground arenaceous quartz, soapstone, marble powder and the like may be used.

The solidity of the buttons produced according to the new method is at least equal to that of the buttons made from ivory-nut.

I claim:—

1. Method for manufacturing of buttons consisting in mixing together at dry state Portland cement, calcite and colouring substance, in stirring the mixture with a solution of sodium chloride and in pressing the mass in moulds.

2. Method for the manufacturing of buttons consisting in mixing together at dry state Portland cement, calcite and colouring substance, in stirring the mixture with a soap solution and in pressing the mass in moulds.

In testimony whereof I affix my signature.

PAUL ANFT.